Figure 1:
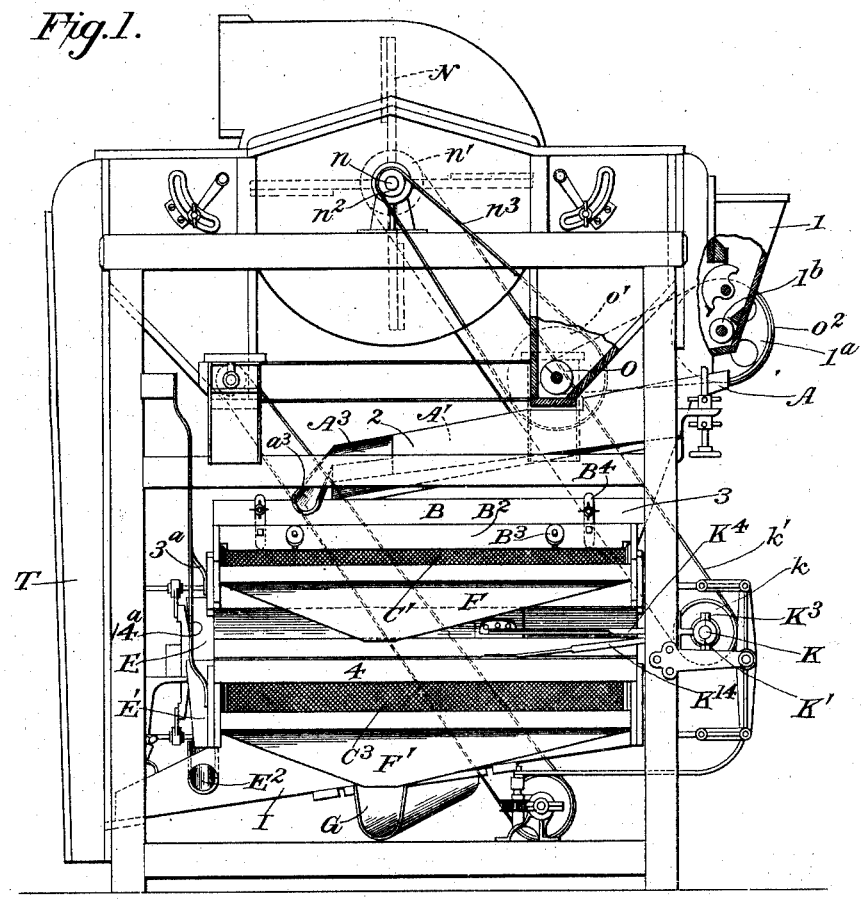

J. B. CORNWALL.
MACHINE FOR SEPARATING GRAIN.
APPLICATION FILED MAY 14, 1908.

927,328.

Patented July 6, 1909.
4 SHEETS—SHEET 1.

Inventor
John B. Cornwall

Witnesses
By
Alexander Sowell Attorneys

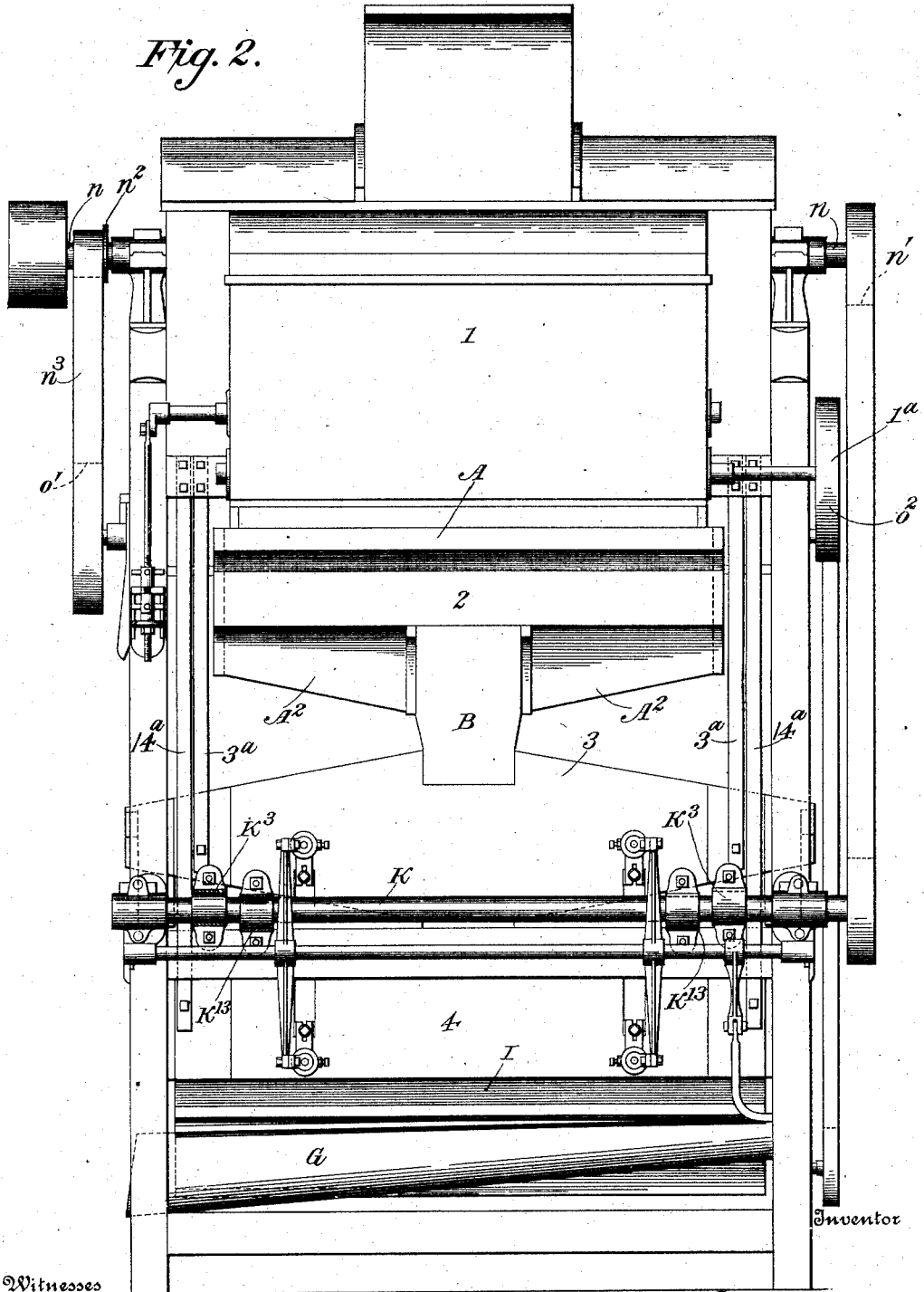

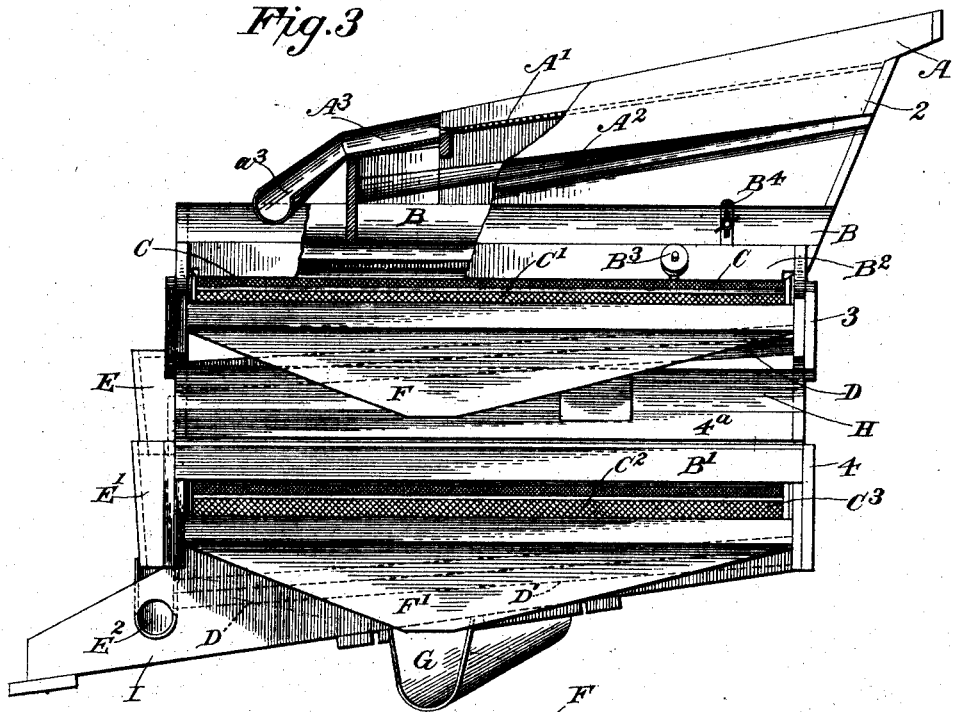
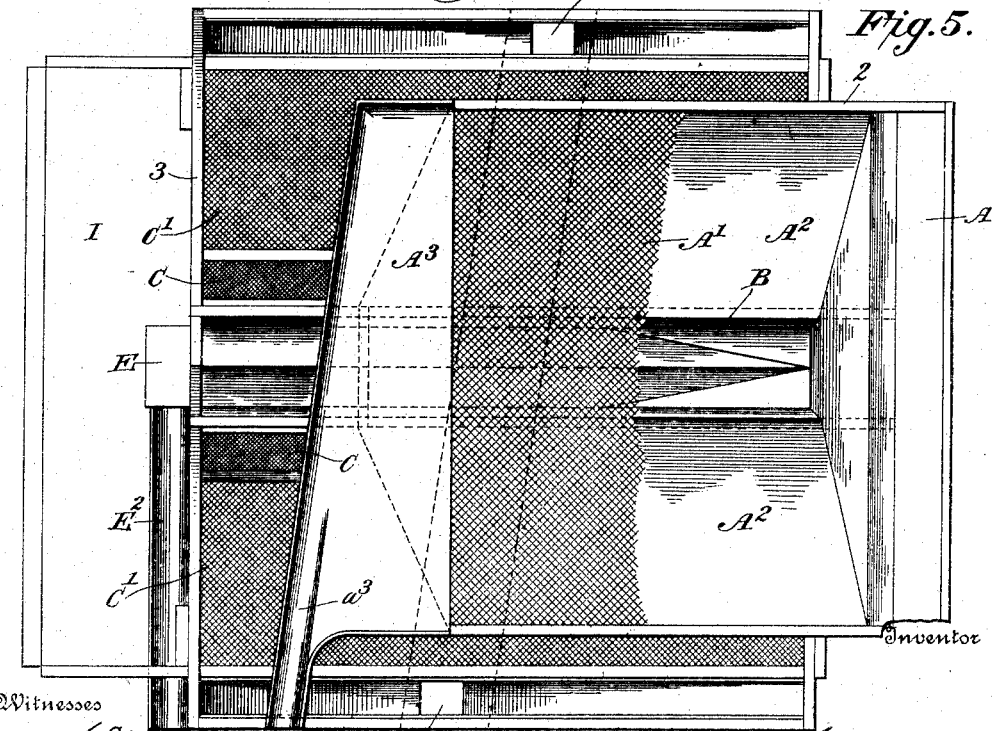

J. B. CORNWALL.
MACHINE FOR SEPARATING GRAIN.
APPLICATION FILED MAY 14, 1908.

927,328.

Patented July 6, 1909.
4 SHEETS—SHEET 4.

Witnesses
M. E. Fowler
James B. Mansfield

Inventor
John B. Cornwall
By
Alexander & Dowell Attorneys

UNITED STATES PATENT OFFICE.

JOHN B. CORNWALL, OF MOLINE, ILLINOIS, ASSIGNOR TO BARNARD AND LEAS MANUFACTURING COMPANY, OF MOLINE, ILLINOIS.

MACHINE FOR SEPARATING GRAIN.

No. 927,328.    Specification of Letters Patent.    Patented July 6, 1909.

Application filed May 14, 1908. Serial No. 432,884.

*To all whom it may concern:*

Be it known that I, JOHN B. CORNWALL, of Moline, in the county of Rock Island and State of Illinois, have invented certain new and useful Improvements in Machines for Separating Grain; and I hereby declare that the following is a full, clear, and exact description thereof, reference being had to the accompanying drawings, which form part of this specification.

This invention is an improvement in machines for separating grain, and, in general, comprises a machine in which the grain first travels over a screen having an "endwise" shaking motion, in the direction of the travel of the grain, and after passing this screen travels over another sieve having a "side" shake motion and over which the grain passes in a direction at right angles to the line of the movement of the sieve; the clean grain being ultimately discharged at the end of the machine into an air separating trunk, while the matters separated from the grain are discharged at the side of the machine.

It has been found in practice that for handling grain with much rough trash in it, it is necessary to have the screen or sieve move back and forth in the line of the travel of the grain, or what is termed an "end shake" motion; while in finer sieve separations, such as are used to clean grain for milling, or for cleaning grains in cereal mills where the separations are desired to be very accurate, it is found that a "side-shake" sieve, or a sieve shaken crosswise of the travel of the grain, produces the best results.

Near the point where the grain is discharged into the air-separating trunk a baffle is arranged across the stream of grain as it travels toward the air separations, so that the stream of grain will be distributed evenly over the bottom of the shoe in passing this baffle. In order to prevent such baffle retaining any grain after running is over, it is so arranged that a small proportion of grain can pass under at all times, and the machine will run clear a very few minutes after the bulk of the grain has passed; thus preventing mixing of different grains when changing from one kind of grain to another.

The central idea of this machine is the combination of the "end shake" and the "side shake" methods of separator with air separations outside of the shoe; the grain being received, when it first enters the machine, upon an "endwise" shaking sieve, while the finer portion of the cleaning is accomplished on a "side shake" sieve; and the grain being ultimately discharged from the lower part of the shoe with an "endwise" motion.

The upper sieve which receives the grain first, is inclined in the direction of the line of motion of the shoe which renders it an "end shake" sieve suitable for running off the coarser trash from the grain; while the next succeeding sieves are inclined transversely of the line of motion of the shoe, and consequently are "side shake" sieves; although moving in the same direction as the upper sieve.

As many of the parts of the machine are well known, it is unnecessary to enter into a detailed explanation of their construction or dimensions, but the following explanation of the machine will enable any one skilled in the art to readily understand the invention and construct a machine in accordance therewith.

The invention will now be more particularly described with reference to the accompanying drawings in which—

Figure 7:
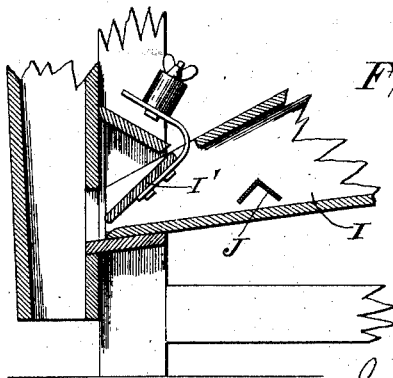
Figure 4:
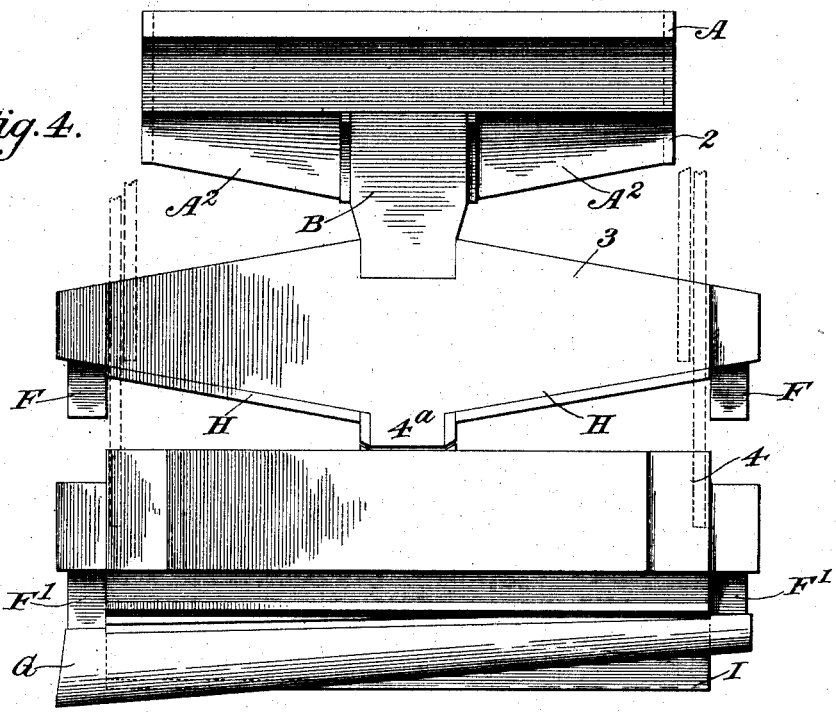
Figure 6:
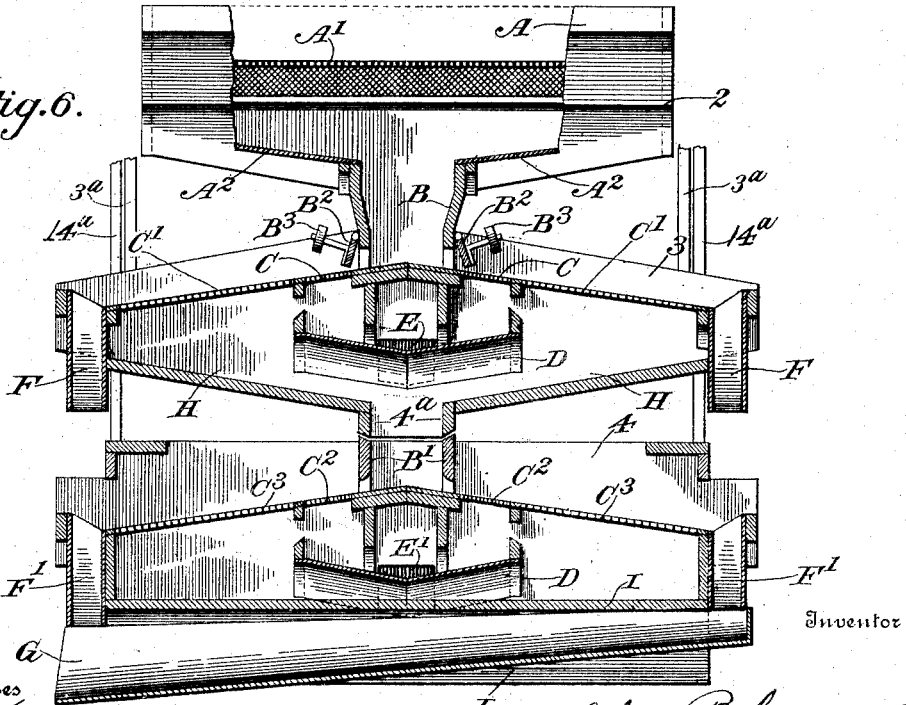

Figure 1 is a side elevation of the complete separating machine, with some portions of the casing partly broken away. Fig. 2 is an elevation of the drive-end of such machine. Fig. 3 is a side elevation of the shaking shoes detached from the frame, partly broken away. Fig. 4 is an end view of Fig. 3. Fig. 5 is a plan view of the shoes partly broken away. Fig. 6 is a transverse sectional view of the shoes and screens. Fig. 7 is a detail sectional view.

From a hopper 1 the grain is fed onto the heel A of the upper shaking screen A' which is mounted in a shoe 2 which is, or may be, supported on a second shoe 3 suspended by straps $3^a$ from members of the main frame, as shown. The shoe 3 is located directly over a third shoe 4 suspended by straps $14^a$ in the frame, as shown; and said shoes may be reciprocated longitudinally of the main frame by means of pitmen $K^4$ and $K^{14}$ connected to eccentric-straps $K^3$ and $K^{13}$ surrounding eccentrics fixed on a shaft K, journaled in boxes K' attached to the end members of the main frame as shown. Said shaft K has a pulley $k$ driven by a belt $k'$ from a pulley $n'$ on the fan-shaft $n$ as shown. Shaft $n$ carries a fan N and as shown is the driving shaft of the machine, and carries a drive pulley $n^2$, which by means of a belt $n^3$, and pulley $o'$ drives a worm-conveyer O, by which the clean grain is discharged from the machine. On the shaft of this conveyer is a pulley $O'$ which by means of a belt $O^2$ and pulley $1^a$ drives the feeder $1^b$ in hopper 1.

As shown the shoe 2 is mounted on shoe 3 and moves with said shoe, and all the shoes, 2, 3 and 4, are vibrated longitudinally of the main frame by means of said eccentrics.

The sieve $A'$ is inclined longitudinally of the shoe 2, and longitudinally of the line of vibration of the shoe so that said sieve has an "endwise" movement and the grain fed thereon is agitated in the direction of its flow. The rough material passing over the sieve $A'$ escapes onto a chute $A^3$ at the lower end of the sieve, said chute having a spout $a^3$ discharging at the side of the machine.

The grain passing through screen $A'$ falls onto the oppositely inclined chutes $A^2$, which form the bottom of the shoe 2, and inclines downwardly from the side to center thereof, so as to direct the grain inwardly to a receiving channel or spout B, which extends centrally and longitudinally of the shoes 2 and 3 and is adapted to direct the grain onto the sieves $C'$ in shoe 3.

The sieves $C'$ are inclined downwardly and outwardly in opposite directions and at right angles to the line of movement of the screen, so that the grain passing thereover is subjected to a "side shake" motion, at right angles to the flow of the grain. The amount of grain passing onto the screens $C'$ is regulated by adjustable valves $B^2$ at the lower sides of channel B, and provided with adjustable weights $B^3$, and adjustable hinges $B^4$.

The trash separated from the grain by sieves $C'$ passes down over the outer edges of the sieves into receptacles or pockets F, F, at the opposite sides of the shoe 3, from which pockets the trash is discharged into similar side pockets $F'$, $F'$, on the lower shoe 4; whence it is ultimately discharged into a transverse trough G, underlying the shoe 4 by which it is finally discharged at the side of the machine.

The fine dirt which passes with the grain onto sieves $C'$ in shoe 3 will, immediately after passing the valves $B^2$, drop into a trough-shaped chute D arranged centrally and longitudinally of the shoe 3 below channel B; and said chute is adapted to discharge this dirt at the rear end of the machine into a short vertical pipe E on the end of shoe 3, which pipe in turn discharges into a like vertical pipe $E'$ on the adjacent end of shoe 4; which pipe $E'$ in turn discharges into a spout $E^2$ attached to shoe 4, and which discharges the dirt at the side of the machine. To prevent grain passing into this dirt chute D, the inner parts C, C, of the sieves $C'$, $C'$, adjacent the channel B and over the chute, should be made of such mesh that while fine dirt can pass therethrough, the good grain will pass onto the coarser parts of the sieves $C'$. The grain passing through sieves $C'$ is caught by the chutes H forming the bottom of shoe 3, and is directed by said chutes inwardly to a central longitudinal opening or channel $4^a$ in the bottom of shoe 3, and by which the grain is directed centrally onto the shoe 4.

The shoe 4 has a central longitudinal receiving pocket or channel $B'$ below which are oppositely inclined sieves $C^3$, which are inclined transversely of the line of motion of the frame so as to be "side shake" sieves and are provided with portions $C^2$ of finer mesh, adjacent the channel $B'$,—and below these fine portions $C^2$ of the sieves $C^3$ is a chute $D'$, similar to chute D and likewise extending rearwardly and discharging into the pipe $E'$, whence the dirt escapes into spout $E^2$. The pocket $B'$ has openings in its sides to allow the grain to pass out onto the sieves $C^2$, $C^3$, as indicated in the drawings, and while the clean grain passes through the sieves $C^3$, any coarse matters separated from the grain by the sieves $C^3$ passes down into the pockets $F'$ on the sides of shoe 4 and thence into the spout G.

The clean grain passing through sieves $C^3$ is received on an inclined chute I, forming the bottom of shoe 4, and passes thereon to the rear end of the machine, where it is discharged from chute I into the lower end of a vertical air-separating trunk T, which is connected at the top with the portion of the machine wherein the air separations are made in the usual manner; this part of the machine being well known requires no particular description herein.

The grain passing from chute I into the trunk T is delivered thereinto in a uniform manner by means of the valve $I'$ of ordinary construction, and the baffle J located across the chute just in advance of the valve. This baffle is novel and is preferably made of angle iron and set a slight distance above the top surface of the chute so that it will retard any overrush of grain and cause it to spread evenly across the chute before reaching the valve, but at the end of a cleaning operation the grain arrested by the baffle will pass thereunder so that the machine can run entirely clean and free of grain before it is again used. This prevents intermixture of different kinds of grain at successive operations of the machine.

I have indicated in the drawings an apparatus for cleaning the sieves, but it is unnecessary to describe the same herein as it forms no part of the present invention and is already patented.

It will be observed from the foregoing description that while the shoes are all reciprocated longitudinally of the main frame, yet by reason of the peculiar arrangement of the sieves in the shoes, the upper sieve A' vibrates in a direction parallel with the movement of the grain thereover, and has the effect on the grain of an "end shake" sieve; while the screens C', C³, being inclined transversely of the movement of the grain thereover, have the same effect upon the grain of "side shake" sieves; thus this machine combines both methods of cleaning and has the advantages of both the end shake and the side shake operations; the air-separations are made outside of the shoes; and the grain is discharged from the lower shoe with an endwise motion, and is also received when it first enters the machine, with an endwise motion, and yet is cleaned principally by the side shake motion.

Having described my invention what I claim as new and desire to secure by Letters Patent is:

1. In a grain separator, the combination of a main frame, a sieve inclined longitudinally of the frame, a central longitudinally disposed channel beneath said sieve; means for conducting grain passing through said sieve into said channel, sieves below said channel and receiving grain therefrom, said sieves being inclined transversely of the main frame; and means for shaking all said sieves.

2. In a grain separator, the combination of a main frame, a sieve inclined longitudinally of said frame, a central longitudinally disposed channel beneath said sieve; chutes for conducting grain passing through said sieve into said channel, sieves below said channel and receiving grain therefrom, said sieves being inclined transversely of the frame, a second set of transversely disposed sieves below the first set thereof, means for directing the grain passing through the first set of transverse sieves onto the second set of transverse sieves, and means for shaking the sieves in the same direction.

3. In a grain separator, the combination of an upper shoe having a longitudinally disposed screen, a lower shoe having transversely disposed screens, and a longitudinal channel in the bottom of the upper shoe discharging centrally onto the inner upper ends of the screens in the lower shoe.

4. In a grain separator, the combination of an upper shoe having a longitudinally disposed screen, a lower shoe having transversely disposed screens, a longitudinal channel in the bottom of the upper shoe discharging onto the inner upper ends of the screens in the lower shoe, a dirt discharging chute in the second shoe under the opening and screens, and trash receiving pockets at the outer sides of the second shoe.

5. In a grain separator, the combination of an upper shoe having a longitudinally disposed screen, a lower shoe having transversely disposed screens, a longitudinal channel in the bottom of the upper shoe discharging onto the inner upper ends of the screens in the lower shoe, the said second shoe having a longitudinal discharging opening in its bottom; and a third shoe below the second shoe having transversely inclined screens and receiving grain from the opening in the second shoe; said third shoe having a longitudinally inclined discharging chute adapted to deliver grain at the end of the machine.

6. In a grain separator, the combination of an upper shoe having a longitudinally disposed screen, a lower shoe having transversely disposed screens, a longitudinal channel in the bottom of the upper shoe discharging onto the upper ends of the screens in the lower shoe, the said second shoe having a longitudinal discharging opening in its bottom, and a third shoe below the second shoe having transversely inclined screens and receiving grain from the opening in the second shoe, said third shoe having a longitudinally inclined discharging chute adapted to deliver grain at the end of the machine; with longitudinally disposed dirt discharging chutes arranged below the upper edges of the screens in the second and third chutes, and trash receiving pockets on the outer sides of the second and third shoes to receive material passing over the screens.

7. In a grain separator, the combination of three shaking shoes, a longitudinally inclined end-shake sieve in the upper shoe and transversely inclined side-shake sieves in the two lower shoes, means for directing the material from the upper sieve successively onto the lower sieve; trash receiving pockets on the side of the lower shoes adjacent the outer ends of the transverse sieves, the pockets of the uppermost side-shake sieves discharging into the pockets of the lower side-shake sieves, and means for recipirocating all said shoes.

In testimony that I claim the foregoing as my own, I affix my signature in presence of two witnesses.

JOHN B. CORNWALL.

Witnesses:
J. H. LONG,
C. H. CORNWALL.